United States Patent [19]

Tanimoto

[11] Patent Number: 5,642,173
[45] Date of Patent: Jun. 24, 1997

[54] GAIN ADJUSTING CIRCUIT FOR FIELD-SEQUENTIAL SIGNAL

[75] Inventor: Noriaki Tanimoto, Kanagawa, Japan

[73] Assignee: Sony Corporation, Japan

[21] Appl. No.: 516,277

[22] Filed: Aug. 17, 1995

[30] Foreign Application Priority Data

Aug. 22, 1994 [JP] Japan .................................. 6-218339

[51] Int. Cl.$^6$ .................................................. H04N 9/73
[52] U.S. Cl. .......................... 348/656; 348/679; 348/742
[58] Field of Search .......................... 348/178, 223,
348/513, 514, 655, 656, 630, 254, 671,
674, 190, 70, 742, 709; 315/383; H04N 17/00,
17/02, 9/73, 5/21

[56] References Cited

U.S. PATENT DOCUMENTS

| | | |
|---|---|---|
| 4,518,986 | 5/1985 | Hinn et al. ............................ 348/190 |
| 4,633,299 | 12/1986 | Tanaka .................................. 348/656 |
| 5,001,556 | 3/1991 | Nakamura et al. ..................... 348/70 |
| 5,142,359 | 8/1992 | Yamamori .............................. 348/70 |

FOREIGN PATENT DOCUMENTS

1681408A1  9/1991  U.S.S.R. .......................... H04N 17/02

*Primary Examiner*—Victor R. Kostak
*Attorney, Agent, or Firm*—Ronald P. Kananen

[57] ABSTRACT

White balance adjustments may be carried out using the same adjustment methods as for a simultaneous system with a field-sequential display method and costs may be reduced because only one amplifier is sufficient for driving the image-receiving tube by constructing an image output circuit for use with a field-sequential display method in such a manner that the gain of a transistor set up using drive adjustment resistors and background adjustment resistors corresponding to red, green and blue is changed over by a switch on the timing of a field synchronization signal using a white balance adjustment circuit.

13 Claims, 4 Drawing Sheets

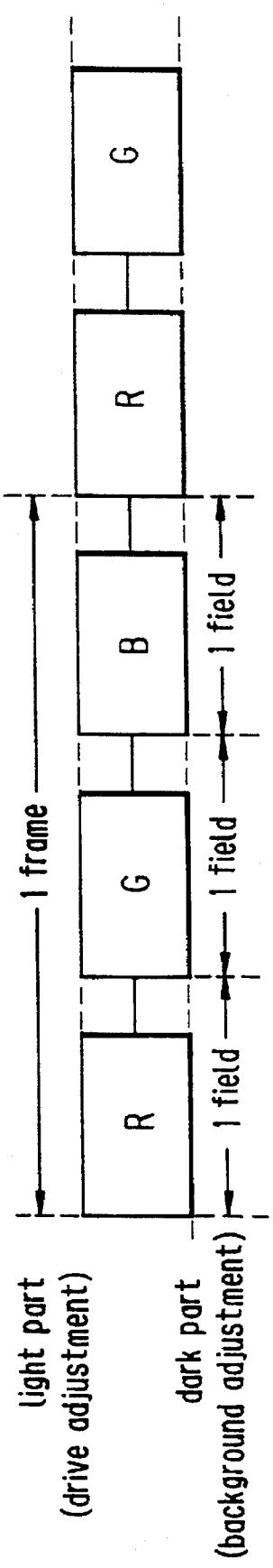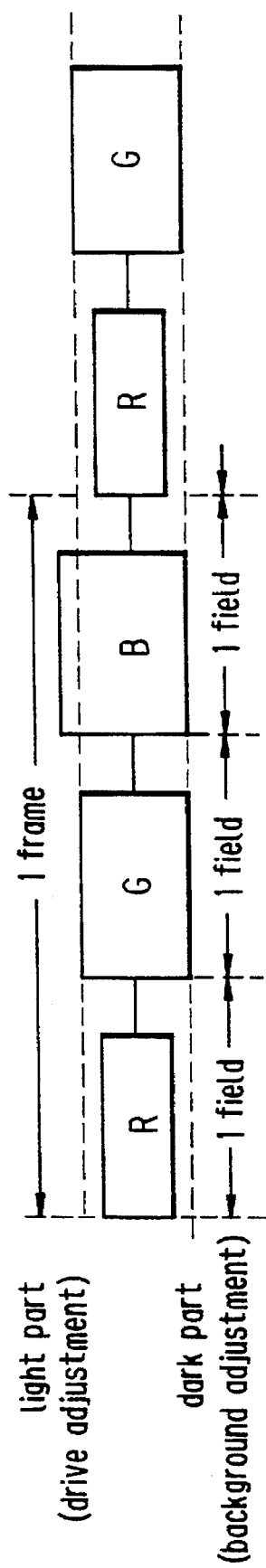

GAIN ADJUSTING CIRCUIT FOR FIELD-SEQUENTIAL SIGNAL

BACKGROUND OF THE INVENTION

1. Field of the Invention

The present invention relates to an image output circuit, for use with television receivers and monitor equipment and so forth, for amplifying image signals and driving image-receiving tubes, and more particularly to an image output circuit for television receivers and the like employing a flat, color image-receiving tube for field-sequential displaying.

2. Description of Related Art

One adjustment carried out on television receivers and monitor equipment and the like is a white balance adjustment.

For example, in a color image-receiving tube, in order to show white, the levels of the emitted red, green and blue light must first be mixed evenly. However, there are differences in the light-emitting efficiency between each of the colors of the light-emitting bodies and differences between the electron guns corresponding to each color. If each color is then outputted as is at an equal electron beam power, the fluorescent materials for each of the colors red, green and blue do not generate light at the same level. As a result, a satisfactory white color will not be obtained, giving the display screen an overall off-color effect. At the image output circuit controlling the strength of the electron beam shone onto the fluorescent screen, white balance may be adjusted by varying the gain and adjusting the light generating level of each of the luminous bodies for the colors red, green and blue colors so that an appropriate white color may be obtained on the screen.

FIG. 1 is a circuit diagram showing an example of an image output circuit including a circuit for carrying out this kind of white balance adjustment. In this case, the so-called simultaneous primary color drive method is shown, where each cathode of the image-receiving tube drives a primary color signal corresponding to red, green and blue outputting three electron beams simultaneously.

In this drawing, first, Z indicates an image-receiving tube employing a cathode ray tube (hereinafter referred to as a "CRT") having a display screen with a body luminous with respect to the three colors red, green and blue, arranged in a stripe shape. Cathodes, KR, KG and KB, and grids GR, GG and GB corresponding to red, green and blue of the reception tube Z are also shown.

Further, Q1, Q2 and Q3 indicate transistors acting as amplifiers taking an input and amplifying each color source signal corresponding to red, green and blue generated by circuit parts of previous stages not shown in the drawings. The primary color signal R for red is connected to the base of transistor Q1. The collector is connected to the main power line VCC via the collector resistor R1 and is also connected to the cathode KR via a discharge protection resistor R4. The emitter is connected to the white balance adjuster 1.

Similarly, for transistor Q2, the signal G for the primary color green is connected to the base, the collector is connected to the main power line VCC via the collector resistor R2 and to the cathode KG via the discharge protection resistor R5, and the emitter is connected to the white balance adjuster 1. Further, the signal B for the primary color blue is provided at the base of the transistor Q3. The collector is connected to the power supply line VCC via the collector resistance R3 and to the cathode KB via the discharge protection resistor R6, and the emitter is connected to the white balance adjuster 1. Furthermore, it is also possible to use an amplifier apparatus consisting of amplifier circuits with operational amplifiers and the like in place of those with transistor elements.

Next, numeral 1, provided on the emitter side of the transistors Q1, Q2 and Q3, indicates the white balance adjuster for adjusting of the white balance. This white balance adjuster 1 comprises a drive adjuster 2 for adjusting the high band (light portions) gain of each of the colors red, green and blue (hereinafter referred to as drive adjustment), and a background adjuster 3 for adjusting dark parts of each of the colors red, green and blue, i.e., adjusting the gain (hereinafter referred to as background adjustment) of the black level portions.

Further, drive adjustment resistors RDR, RDG and RDB have been provided at the drive adjuster 2 so that the emitter-earth resistance of the transistors Q1, Q2 and Q3 can be varied as necessary. Arbitrary variation of these resistances varies the amplification factor of the transistors Q1, Q2 and Q3 and the gain of each of the red, green and blue color signals may therefore be adjusted.

Moreover, background resistors RBR, RBG and RBB are provided at the background adjustment part in parallel across the main power line VCC and earth so that the voltage dividing point may be varied. The voltage dividing point of the background adjustment resistor RBR is connected to the emitter of transistor Q1 via resistor R7. The voltage dividing point of the background adjustment resistor RBG is connected to the emitter of transistor Q2 via resistor R8 and the voltage dividing point of the background adjustment resistor RBB is connected to the emitter of transistor Q3 via resistor R9. As a result, the voltage ratio obtained by varying each of the background adjustment resistors RBR, RBG and RBB and the d.c. voltages set up by the resistors R7, R8 and R9 are superimposed across each of the emitter-earth junctions of the transistors Q1, Q2 and Q3. The black level may then be adjusted by varying this value.

In this kind of construction, each of the red, green and blue primary color signals inputted to the base of the transistors Q1, Q2 and Q3 is amplified taking the collector resistances R1, R2 and R3 as output resistances. Each of the primary color signals are then varied in synchronization with potentials applied to each of the cathodes KR, KG and KB via resistors R4, R5 and R6. A satisfactory white balance may then be obtained by adjusting the strength of the light and dark areas while, for example, a gray scale image or the like is displayed on the image-receiving tube Z so as to graduate from white to black. The adjustments are made by altering the gains of transistors Q1, Q2 and Q3 by adjusting each of the drive adjustment resistors RDR, RDG and RDB of drive adjuster 2 and each of the background adjustment resistors RBR, RBG and RBB of the background adjuster 3.

When a shallow, flat image-receiving tube is used as opposed to the so-called "straight type" of image-receiving tube described above, displaying a simultaneous color image becomes difficult. Because of this, a picture corresponding to each of the colors red, green and blue is displayed every one field and one frame is formed from three of these field pictures. It is then preferable to adopt a so-called "field-sequential system" where a single color image is expressed by after-image phenomena obtained using each field picture.

More specifically, the field images for the colors red, green and blue are obtained by placing a filter which allows only one of the colors red, green or blue to pass through in front of the image-receiving tube. Sequential changeover control is then exerted to ensure that only one of the colors red, green and blue is allowed to pass through per each one field.

In addition, it is also necessary to obtain a satisfactory white balance for the field-sequential system by adjusting the strength of each color of the red, green and blue field images which have been combined into groups comprising three fields. However, in the case of the field-sequential system, individual electron beams for each of the colors red, green and blue cannot be obtained in the way for the simultaneous system in FIG. 1 because the electron beams are outputted by a single electron gun. The white balance can therefore not be adjusted by setting up the image output gain for each of the colors red, green and blue beforehand.

SUMMARY OF THE INVENTION

It is therefore an object of the present invention to develop an image output circuit with a white balance adjustment circuit capable of carrying out a white balance adjustment in field-sequential systems as well as simultaneous systems.

An image output circuit for amplifying, using an amplifying part, an image signal provided by a field-sequential method, and driving an image-receiving device, comprises a gain varying part for varying the gain of the amplifying part at a timing corresponding with a field-sequential period. The gain varying part comprises a gain set-up signal output part for outputting three system gain set-up signals adjusted to correspond to each R, G and B field picture and a switch part for sequentially alternating in a prescribed order, at a timing based on a field synchronization signal, between the three system gain set-up signals provided from the gain set-up signal output part and providing the selected signal to the amplifying part.

The image-receiving device provided for the image output circuit of the present invention was taken to be a flat, image-receiving tube.

According to this construction, the amplifier gain set-up corresponding to the colors red, green and blue may be sequentially changed every one field. This allows the methods employed in the adjustment of the white balance of simultaneous systems to be used in display systems for flat-type image-receiving tubes utilizing field-sequential systems.

BRIEF DESCRIPTION OF THE DRAWINGS

FIG. 4A and FIG. 4B of FIG. 4 are views showing a white balance adjustment method of this embodiment.

DETAILED DESCRIPTION OF THE PREFERRED EMBODIMENTS

Figure 2:
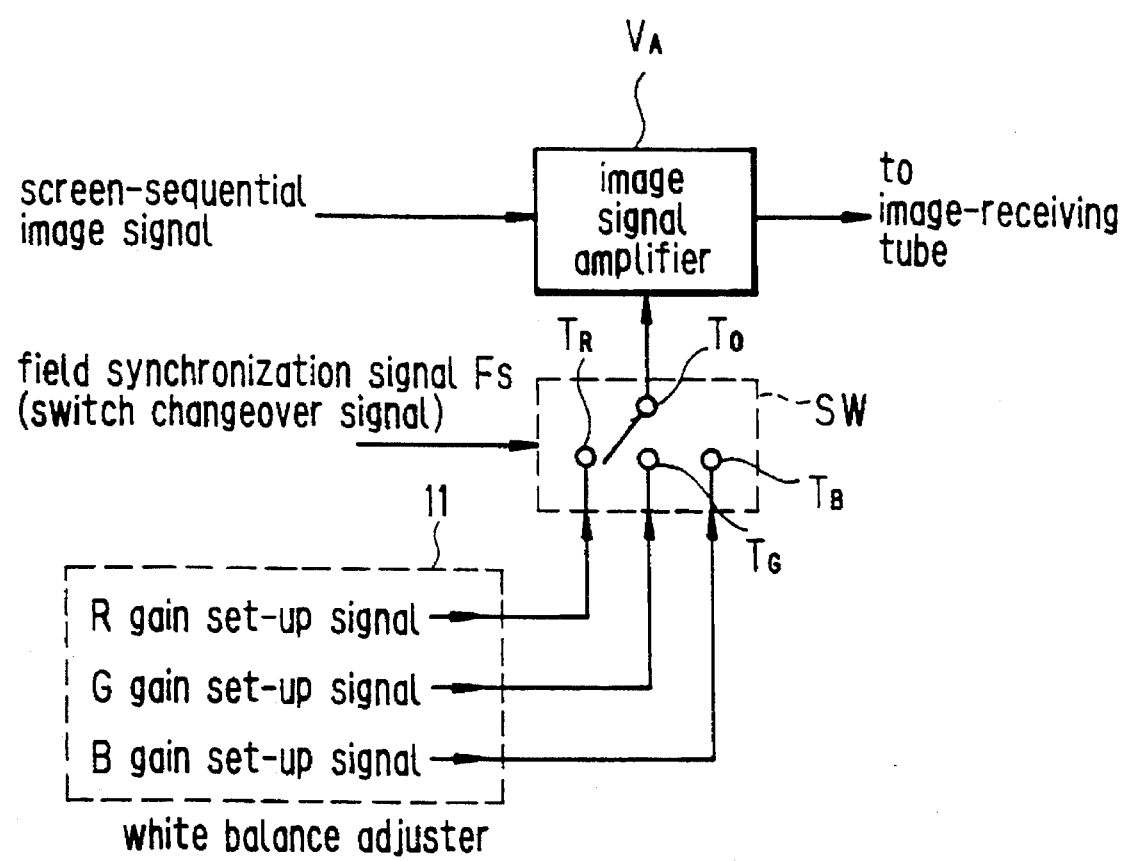
FIG. 2 is a conceptual view showing the basic structure of an image output circuit for field-sequential signal image-receiving equipment for a first embodiment of the present invention.

The following is a detailed description with reference to the drawings of the embodiments of the present invention.
First Embodiment FIG. 2 is a block diagram showing an outline of the construction of an image output circuit of a first embodiment of the present invention.

In this drawing, VA indicates an image signal amplifier, comprising transistors and other elements, for supplying the image-receiving tube with image signals amplified using a field-sequential system. Further, numeral 11 indicates a white balance circuit for setting the gin of the image signal amplifier VA and outputting a gain set-up signal. In this case, as shown in the drawing, gain set-up signals for each of the colors red, green and blue are outputted. It is possible to adjust these gain signals as deemed necessary.

SW indicates a switch which may be changed over between each of the red, green and blue gain set-up signals connected to terminals TR, TG and TB shown in the drawing, so as to provide the selected signal to the image signal amplifier VA via terminal TO. The gain of the image signal amplifier VA is then altered in accordance with the gain set-up signal provided via the switch SW. The field synchronization signal is then supplied as a switch changeover signal at this switch SW, as shown in FIG. 2. This switch SW then repeatedly changes over in sequence between the three terminals so as to correspond with the sequence of the screen colors displayed field-sequentially in synchronization with each one field. The gain can therefore be adjusted at the image signal amplifier VA so as to correspond with the displayed screen color every one field.
Second Embodiment Next, a description will be given of a specific example of an image output circuit of a second embodiment of the present invention using FIG. 3.

In this drawing, Q11 indicates a transistor for driving the image-receiving tube Z' (CRT). An image signal corresponding to the red, green and blue images employing the field-sequential method is provided to the base of the transistor Q11 with the collector being connected to a power supply line VCC via a collector resistance R11 and an amplified output being provided to the cathode K of the image-receiving tube Z' via a discharge protection resistor R12. That is, this transistor Q11 corresponds to the image signal amplifier VA of FIG. 2. In this case, an amplifier having a combination of two or three transistors may also be used as the transistor Q11.

Further, in this embodiment, a flat-type CRT has been used as the image-receiving tube Z' within which just one system compatible with the field-sequential method is provided for an electron gun comprising a cathode K and a grid G, as shown in the drawing. Moreover, the emitter of the transistor Q11 is connected to the terminal TO of an analog switch SW14 (hereinafter referred to simply as a "switch") comprised of, for example, a semiconductor or the like type of switch.

Further, in the same way as for the switch SW shown in FIG. 2, the switch SW14 of this drawing is made to alternate between TR, TG and TB with respect to the terminal TO in accordance with a field sequence corresponding to the red, green and blue image signals displayed by the actual field sequence employing the field synchronization signal FS.

Figure 1:
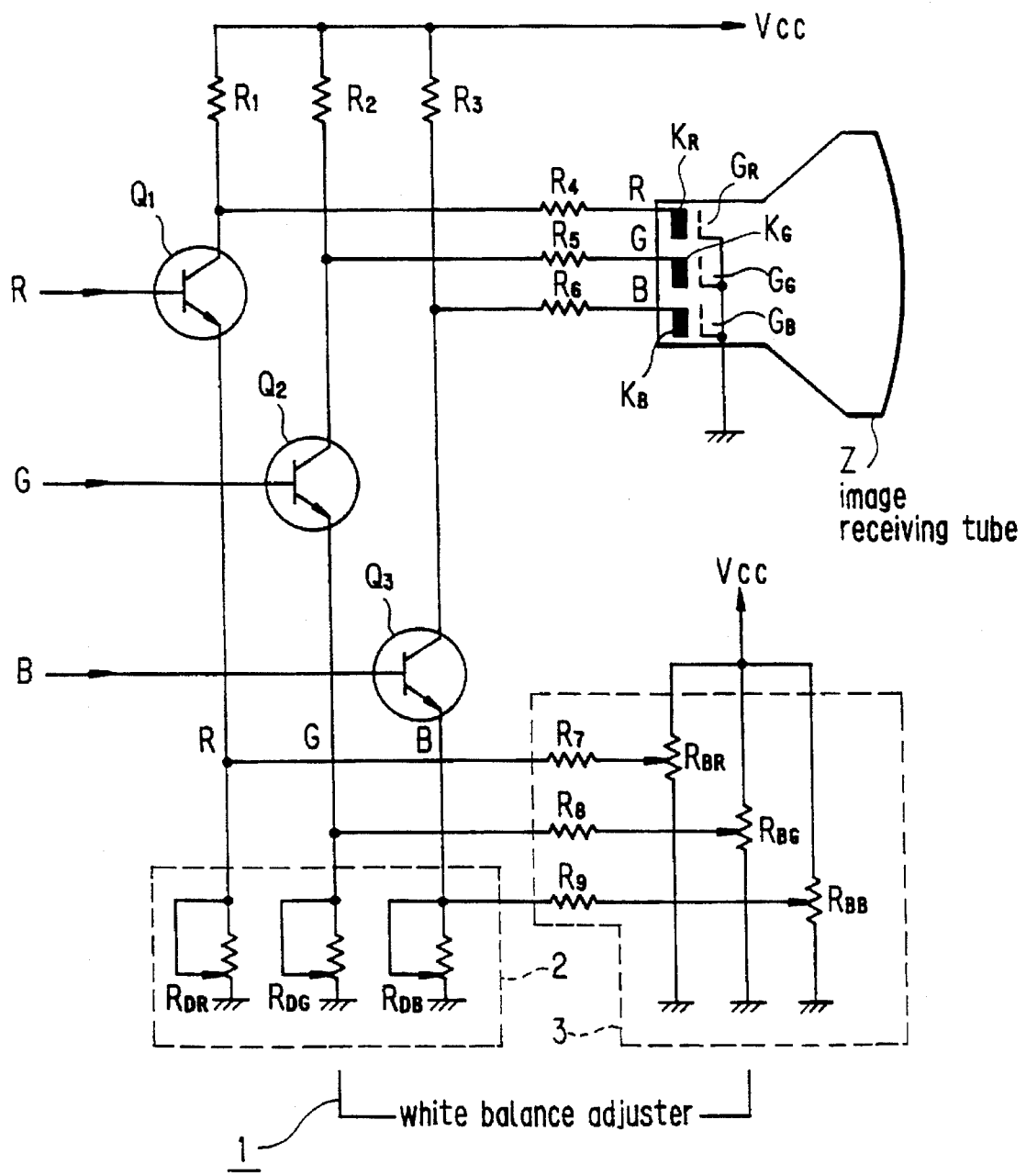
FIG. 1 is a circuit diagram showing an image output circuit for related art image receiving equipment for use with synchronous RGB transmission signals.

Next, numeral 11 provided on the side of the terminals TR, TG and TB of the switch SW14 in this second embodiment indicates a white balance adjustment circuit constructed from a drive adjuster 12 and a background adjuster 13. The drive adjuster 12 has the same structure as that shown in FIG. 1 and descriptions are omitted for items having the same numerals. Also, at the background adjuster 13, the construction is the same as for FIG. 2 except for resistors R7, R8 and R9 being taken to be resistors R14, R15 and R16.

At the image output circuit of this structure, the terminal T0 of the switch SW is connected to TR for the field duration for which the field-sequential image signal corresponding to red of the base of, for example, the transistor Q11 is provided. Therefore, by applying a voltage in the region of the dark screen cut-off point setup by adjusting the drive adjustment resistor R'DR and the background adjustment resistor R'BR and the drive signal gain to the transistor Q11 (i.e. this corresponds to providing the gain set-up signal described in FIG. 2), the illumination power of the electron beam can be controlled based on this set-up and the luminance of the red field color can be set-up.

Moreover, the T0 terminal of the switch SW14 is connected to the terminal TG for the field duration of the green image signal being provided to the transistor Q11. The green-field color luminance can therefore be set up as a result of a voltage in the region of the dark field cut-off point set-up by adjusting the drive adjustment resistance R'DG and the BGK adjustment resistance R'BG and the drive gain signal being applied to the transistor Q11. Further, the terminal TO of the switch SW14 is connected to the terminal TB during the field period when the image signal for blue is provided to the transistor Q11. The blue field luminance can then be set up by applying a voltage in the region of the dark field cut-off set up by adjusting the drive adjustment resistor R'DB and the BGK adjustment resistor R'BB, and the drive signal gain, to the transistor Q11.

As described above, in the field-sequential method, the image for a three field portion of red, green and blue is taken as one frame so that a color image corresponding to one image portion may be obtained during this time using the after-image phenomena. Therefore, the white balance adjustment may also be carried out in this embodiment in exactly the same way as for the simultaneous system shown in FIG. 1 without any changes by, for example, displaying a gray scale and so forth as an image signal and adjusting the drive adjustment resistors and background adjustment resistors corresponding to each of the red, green and blue colors of the white balance adjustment circuit 1 while looking at this gray scale.

Here, a description will be given of a specific example of an actual white balance adjustment with reference to FIG. 4.

For example, according to FIGS. 4(A) and (B) respectively, the field picture is displayed in the sequence red, green and blue in this embodiment, with one frame being formed from these three field pictures. Then, in the case of FIG. 4(A), the vertical width of each of the red, green and blue field pictures coincides with the respective light parts and dark parts shown by the broken line. However, these are shown as prescribed center values (gains) for each of the adjustment values for the drive adjustments for each of the colors red, green and blue and the background adjustments.

Figure 3:
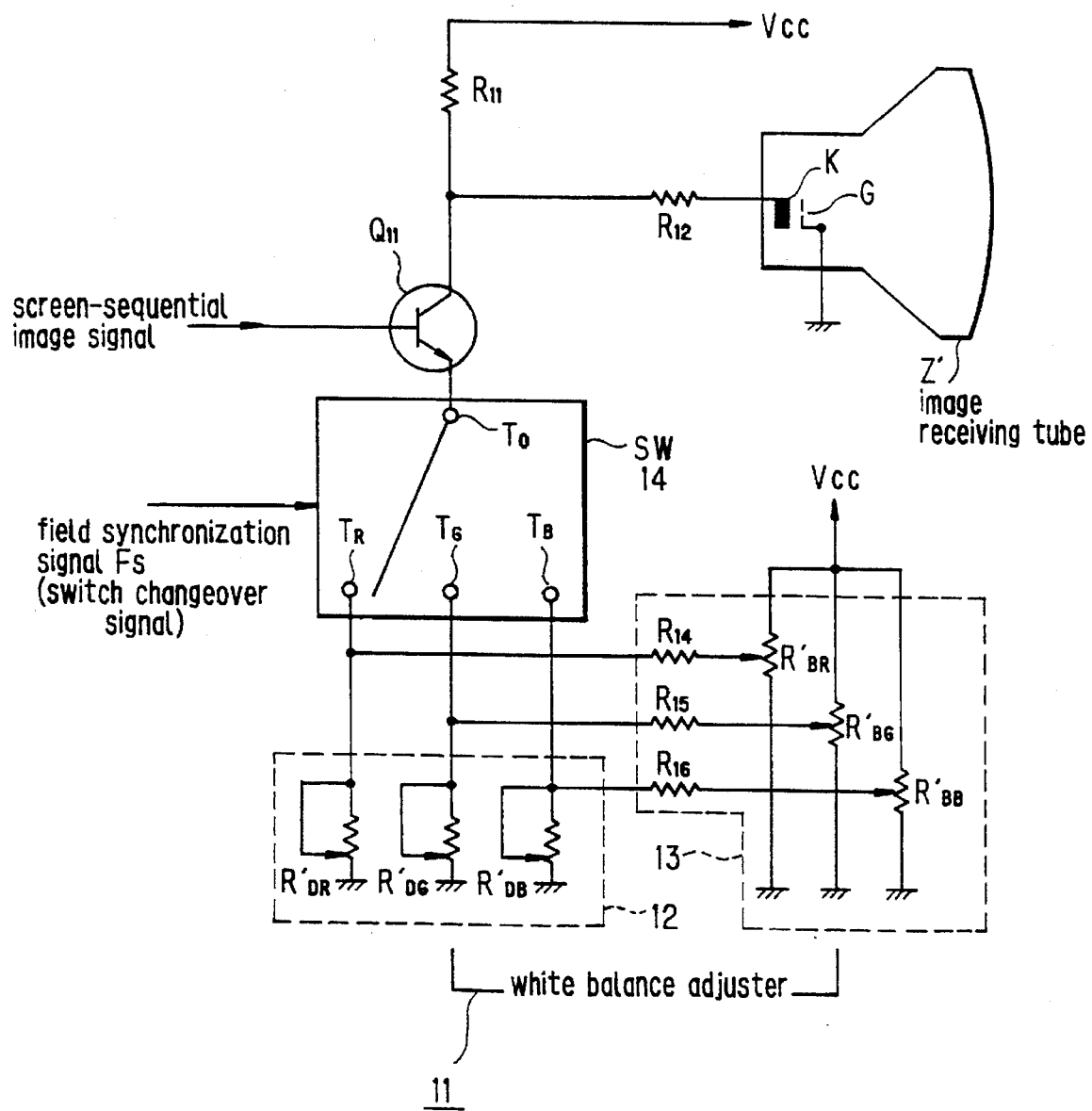
FIG. 3 is a circuit diagram showing a specific example of an image output circuit for a second embodiment of the present invention.

Then, viewing from the side of the light part of the gray scale displayed as an image, when it is considered that having less red, leaving green as it is, and having more blue will give a preferred white balance, the drive adjustment resistor R'DR corresponding to red of the drive adjuster 12 shown in FIG. 3 is adjusted, with the gain for red being reduced until a setting is reached which is satisfactory to the person making the adjustments. On the other hand, the drive adjustment resistor R'DB corresponding to blue is adjusted so that the gain is increased.

Further, looking from the side of the dark parts of the gray scale, if it is determined that a desirable white balance can be achieved by making just red light brighter whilst leaving blue and green as is, R'BR of the background adjuster 3 is adjusted up until the necessary level is reached.

Each of the image output gains corresponding to red, green and blue are varied using these kinds of adjustments as shown by the vertical width in FIG. 4(B) and a white-balanced image is obtained as a result of displaying each of the red, green and blue field pictures using this gain balancing.

In the aforementioned embodiment, a description was given for a flat-type image-receiving tube Z. However, the present invention is by no means limited to a flat-type, and a normal-shaped image-receiving tube (a so-called "straight type") would also be suitable, providing that the display method is field-sequential.

As described above, the image output circuit of the present invention is capable of carrying out white balance adjustments using adjustment methods which are the same as those for simultaneous systems even when the display method is a field-sequential method. Also, in simultaneous systems, a single transistor (or an amplifier circuit using a plurality of transistors combined or an operational amplifier etc.) is provided to correspond to each of the colors red, green and blue. However, with the amplifier circuit of the present invention, one amplifier circuit is sufficient and costs may be reduced accordingly.

What is claimed is:

1. An image output circuit comprising:

input means for inputting an image signal to the image output circuit provided by a field-sequential method;

amplifying means consisting of a single amplifier for amplifying said image signal and directly driving an image-receiving device; and gain varying means for varying a gain of the amplifying means at a timing corresponding with a field-sequential period.

2. An image output circuit according to claim 1, the gain varying means comprising:

gain set-up signal output means for outputting three system gain set-up signals adjusted to correspond respectively to each of red, green and blue field pictures; and switch means for sequentially alternating in said field picture order, at a timing based on a field synchronization signal, between the three system gain setup signals provided from the gain set-up signal output means and providing a selected signal to the amplifying means.

3. An image output circuit according to claim 2, wherein the white balance is set-up using the gain varying means and the switch means.

4. An image output circuit according to claim 1, wherein the image-receiving device is a flat reception tube.

5. An image output circuit for amplifying, using an amplifying means consisting of a single amplifier, an input image signal provided to the circuit by a field-sequential method, and directly driving an image-receiving device, comprising:

gain varying means for varying a gain of the amplifying means consisting of a single amplifier at a timing corresponding with a field-sequential period and providing a modified signal to only one cathode of an image-receiving tube.

6. An image output circuit according to claim 5, the gain varying means comprising:

gain set-up signal output means for outputting three system gain set-up signals adjusted to correspond respectively to each of red, green and blue field pictures; and switch means for sequentially alternating in said field picture order, at a timing based on a field synchronization signal, between the three system gain setup signals provided from the gain set-up signal output means and providing the selected signal to the amplifying means.

7. An image output circuit according to claim 5, wherein the image-receiving device is a flat reception tube.

8. An image output circuit according to claim 6, further equipped with a transistor having an emitter, base and collector, with the gain set-up signal alternately output from the switching means being provided to the emitter, a field-sequential image signal being provided to the base and an output signal being provided at a cathode of the image-receiving tube from the collector.

9. An image output circuit according to claim 8, the gain set-up signal output means comprising a drive adjustment part and a background adjustment part, with the drive adjustment part being constructed from variable resistors corresponding to red, green and blue, used, together with the transistor load, for setting up the signal gain.

10. An image output circuit according to claim 9, wherein the values of the variable resistances of the drive adjustment part, for use with the colors red green and blue are set-up to predetermined values and the white balance adjustment is carried out.

11. An image output circuit for amplifying, using an amplifying means, an input image signal provided to the circuit by a field-sequential method, and driving an image-receiving device, comprising:

gain varying means for varying the gain of the amplifying means at a timing corresponding with a field-sequential period and providing a modified signal to only one cathode of an image-receiving tube;

gain set-up signal output means for outputting three system gain set-up signals adjusted to correspond respectively to each of red, green and blue field pictures;

switch means for sequentially alternating in said field picture order, at a timing based on a field synchronization signal, between the three system gain setup signals provided from the gain set-up signal output means and providing the selected signal to the amplifying means;

a transistor having an emitter, base and collector, with the gain set-up signal alternately output from the switching means being provided to the emitter, a field-sequential image signal being provided to the base and an output signal being provided at a cathode of the image-receiving tube from the collector; and the gain set-up signal output means comprising a drive adjustment part and a background adjustment part, with the drive adjustment part being constructed from variable resistors corresponding to red, green and blue, used, together with the transistor load, for setting up the signal gain.

12. An image output circuit according to claim 11, wherein the values of the variable resistances of the drive adjustment part, for use with the colors red, green and blue, are set-up to predetermined values and a white balance adjustment is carried out.

13. An image output circuit according to claim 11, wherein the image-receiving device is a flat reception tube.

* * * * *